(12) United States Patent
Mallampalli et al.

(10) Patent No.: US 7,669,411 B2
(45) Date of Patent: Mar. 2, 2010

(54) COOLING DEVICE

(75) Inventors: Hemant P. Mallampalli, Peoria, IL (US); Fayz Khan, Baltimore, MD (US); Jason D. Schuster, Peoria, IL (US); Brandon J. Stephens, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 11/431,391

(22) Filed: May 10, 2006

(65) Prior Publication Data

US 2007/0261399 A1   Nov. 15, 2007

(51) Int. Cl.
*F01N 3/00* (2006.01)

(52) U.S. Cl. .............................. 60/298; 60/289; 60/308; 60/316; 60/317; 60/320

(58) Field of Classification Search .................... 60/274, 60/289, 298, 308, 316, 317, 318, 319, 320, 60/295, 303, 311
See application file for complete search history.

(56) References Cited

U.S. PATENT DOCUMENTS

| | | | | |
|---|---|---|---|---|
| 2,501,767 A * | 3/1950 | Fluor et al. | ................. | 181/262 |
| 3,022,934 A * | 2/1962 | Gerald | ........................ | 417/168 |
| 3,595,015 A * | 7/1971 | Kretschmer | ................... | 60/303 |
| 3,875,745 A | 4/1975 | Franklin | | |
| 4,388,804 A * | 6/1983 | Bushmeyer | ................... | 60/319 |
| 4,589,254 A * | 5/1986 | Kume et al. | ................... | 60/286 |
| 4,792,014 A * | 12/1988 | Shin-Seng | ................... | 181/280 |
| 4,926,638 A * | 5/1990 | Kakuta | ......................... | 60/319 |
| 5,590,522 A * | 1/1997 | Kynsilehto et al. | ............ | 60/299 |
| 6,185,934 B1 * | 2/2001 | Teboul | ........................ | 60/297 |
| 6,832,872 B2 * | 12/2004 | Koelm et al. | ................. | 404/108 |
| 6,928,890 B2 * | 8/2005 | Gehner et al. | ................. | 73/863 |
| 2007/0245725 A1 | 10/2007 | Brown et al. | | |

* cited by examiner

*Primary Examiner*—Binh Q Tran
(74) *Attorney, Agent, or Firm*—Finnegan, Henderson, Farabow, Garrett & Dunner

(57) ABSTRACT

A device for cooling a gas is provided. The device comprises an inlet having a first diameter, a mixing section downstream of the inlet and having a second diameter, and an opening in fluid communication with the mixing section and a source of air. The device is such that the second diameter is smaller than the first diameter and a vacuum is created for drawing in the air from the opening as gas passes from the inlet to the mixing section so that the air drawn into the mixing section mixes with the gas. A method for mixing two gases and an exhaust system are also provided.

10 Claims, 2 Drawing Sheets

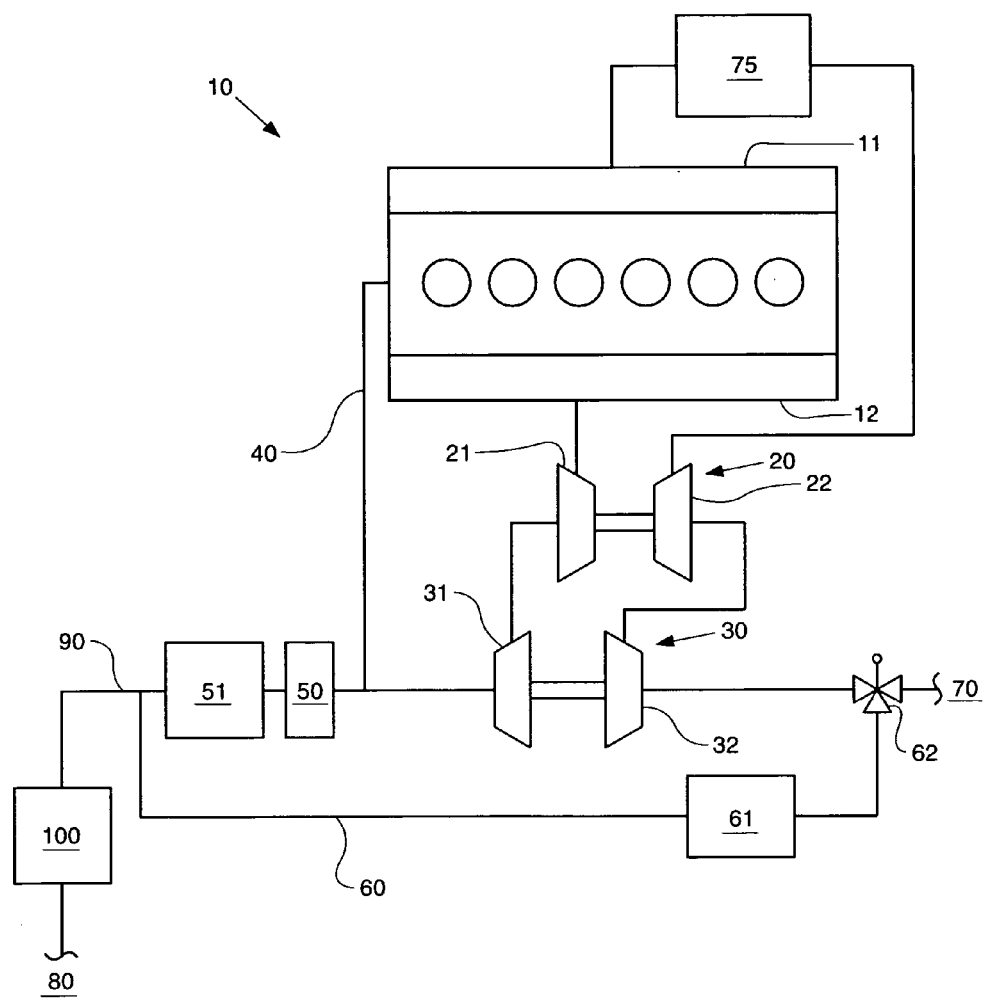
Fig-1-

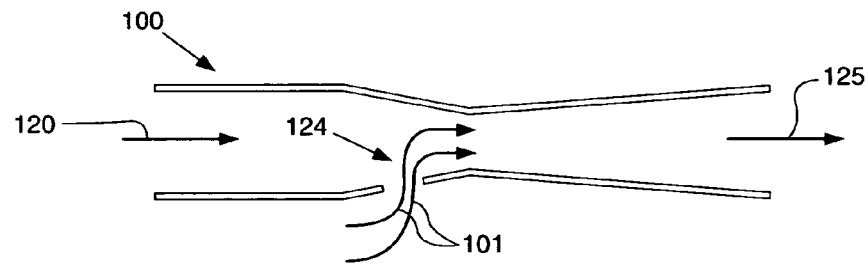
Fig-2-
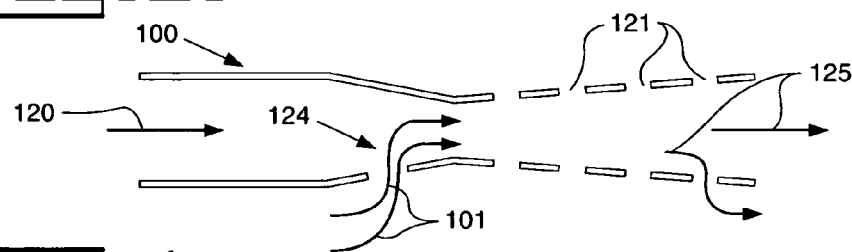
Fig-3-
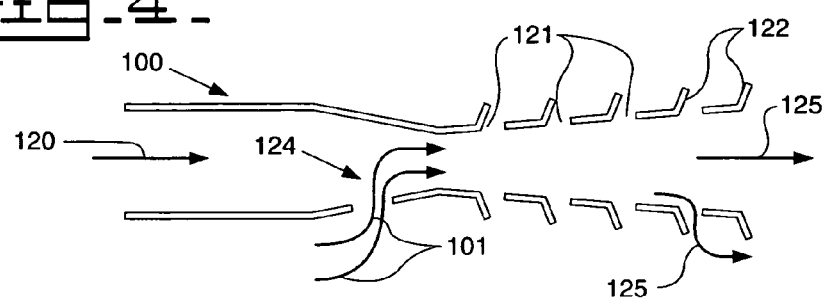
Fig-4-
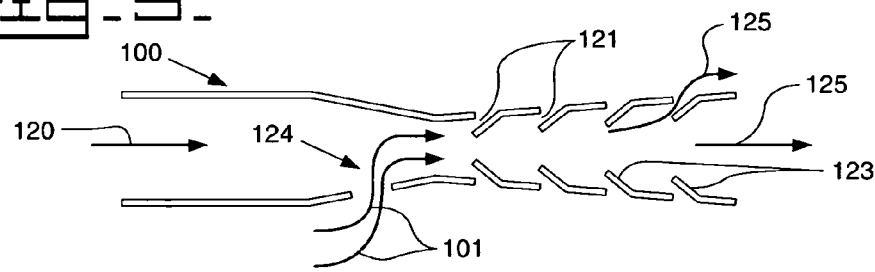
Fig-5-
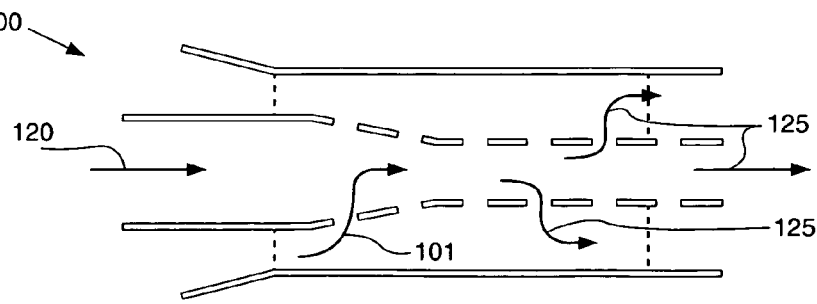
Fig-6-

COOLING DEVICE

TECHNICAL FIELD

The present disclosure relates generally to a cooling device and, more particularly, to an exhaust gas cooling device within the exhaust stream of an engine.

BACKGROUND

Internal and external combustion engines produce exhaust gases that may reach very high temperatures. These temperatures may be high enough to pose a safety hazard to any personnel present near the engine's exhaust outlet-to-atmosphere.

To correct this problem, some engine manufacturers use exhaust pipes of sufficient length to cool the exhaust gas before it enters the environment. Unfortunately, some exhaust temperatures are too high and require additional cooling solutions.

Today, many engines are equipped with catalytic converters and particulate filters in the exhaust system that may further increase the exhaust outlet-to-atmosphere temperatures. For example, particulate filters may be configured to collect unburned hydrocarbons—or soot—from the engine's exhaust. Periodically, the filter regenerates, which causes these collected hydrocarbons to undergo an exothermic reaction and burn. This exothermic reaction may result in a large release of thermal energy, thereby further increasing the exhaust-to-outlet temperature.

U.S. Pat. No. 3,875,745 to Franklin ("'745") discloses a device utilizing the Coanda effect to introduce exhaust gas around a lip on one end of a venturi tube, causing the exhaust gas to flow in a high velocity film adherent to the inner surface of the tube. The laminar flow of '745 draws in a large volume flow of air through the center of the venturi, cooling 1000° F. exhaust gas down to almost ambient temperature in a distance of a few inches.

The device of '745, however, may not be suitable for many applications. For example, according to '745, "For effective operation, the gases must pass through catalytic converter at a temperature not lower than 1000° F." Further, the device of '745 may result in a prohibitively high exhaust back-pressure, thereby detrimentally affecting the engine's Brake Specific Fuel Consumption. Even further, the device of '745 may be expensive to manufacture, making its cost prohibitively expensive.

The disclosed exhaust-gas cooling device is directed to overcoming one or more of the problems set forth above.

SUMMARY

In one embodiment of the present disclosure, a device for cooling a gas is provided. The device comprises an inlet having a first diameter, a mixing section downstream of the inlet and having a second diameter, and an opening in fluid communication with the mixing section and a source of air. In this embodiment, the second diameter is smaller than the first diameter and a vacuum is created for drawing in the air from the opening as gas passes from the inlet to the mixing section so that the air drawn into the mixing section mixes with the gas.

In another embodiment of the present disclosure, a method of cooling an exhaust gas of an engine is provided. The method comprises providing a venturi for receiving exhaust gas, drawing in aspirated air at a throat of the venturi, and cooling the exhaust gas by mixing the exhaust gas with the aspirated air.

In even another embodiment of the present disclosure, a method for mixing two gases is provided. The method comprises providing a first gas, providing a second gas, passing the first gas through a converging nozzle, creating a vacuum as the first gas passes through the converging nozzle, drawing in the second gas with the vacuum, and mixing the first gas with the second gas.

In yet another embodiment of the present disclosure, an exhaust system of an engine is provided. The exhaust system comprises an exhaust pipe comprising high pressure exhaust gas, a venturi tube positioned within the exhaust pipe for receiving the exhaust gas, and an opening within a throat of the venturi tube. In this particular embodiment, aspirated air is drawn in the throat of the venturi tube and mixes with the exhaust gas.

BRIEF DESCRIPTION OF THE DRAWINGS

FIG. 1 is a diagrammatic illustration of an engine having an exhaust cooling device according to an exemplary embodiment of the present disclosure; and FIG. 2 is a cross-sectional view of a particular exhaust cooling device;

FIG. 3 is a cross-sectional view of another particular exhaust cooling device;

FIG. 4 is a cross-sectional view of yet another particular exhaust cooling device;

FIG. 5 is a cross-sectional view of even yet another particular exhaust cooling device; and FIG. 6 is a cross-sectional view of another particular exhaust cooling device.

DETAILED DESCRIPTION

FIG. 1 illustrates an engine 10 with a cooling device 100 according to an exemplary embodiment of the present disclosure.

In this particular embodiment, engine 10 has intake manifold 11 and exhaust manifold 12. Intake air enters intake manifold 11 to facilitate the combustion within engine 10. Exhaust gas 120—shown in FIGS. 2-6—from the combustion process then enters exhaust manifold 12.

The oftentimes high-temperature and high-pressure exhaust 120 may then be used to drive a high-pressure turbocharger 20. In this case, exhaust gas 120 drives turbine 21 to impart rotational energy to compressor wheel 22. Compressor wheel 22 is connected to turbine 21 via a common shaft. As the high-pressure exhaust 120 drives turbine 21, the rotational energy imparted on compressor 22 helps pressurize intake air prior to entering intake manifold 11.

In some embodiments, it may be desirable to add a second turbocharger 30. Low-pressure turbocharger 30, like turbocharger 20, may have a turbine 31 and compressor 32 for further pressurizing intake air.

In the particular embodiment of FIG. 1, once exhaust gas 120 exits turbine 31, exhaust gas 120 enters particulate filter 51. In this embodiment, a regeneration device 50 is positioned upstream of filter 51. Regeneration device may be, for example, a burner configured to generate heat for regenerating filter 51.

As exhaust gas 120 enters filter 51, soot, ash, and/or any other particulate material may be deposited within filter 51. Periodically, it may be desirable to regenerate filter 51 in order to burn any collected hydrocarbons—soot. In this particular embodiment, the regeneration may be initiated by regeneration device 50. Device 50 may be configured to generate heat to begin the regeneration of filter 51. During the regeneration of filter 51, an exothermic reaction occurs as the soot burns, resulting in very high temperatures. These temperatures may even exit filter 51 at or above 650° C.

After exhaust gas 120 exits filter 51, some exhaust gas 120 may enter gas induction line 60. In this particular embodiment, cooler 61 may then cool the exhaust gas 120 that enters line 60. Cooler 61 may be any type of heat exchanger that is known in the art, such as a parallel-flow heat exchanger that uses engine 10 jacket water (not shown) as a cooling sink.

In this particular embodiment, once exhaust gas 120 exits cooler 61, control valve 62 may be actuated for regulating the amount of exhaust gas 120 that mixes with ambient air 70. Control valve 62 permits for a controlled mixing of recirculated exhaust gas 120 with ambient air 70 prior to entering compressors 32 and 22 of turbochargers 30 and 20, respectively.

After the pressurized mixture of ambient air 70 and recirculated exhaust gas 120 leaves compressor 22, it may then be cooled in cooler 75. Cooler 75 may be any known heat exchanger known in the art. In one particular embodiment, cooler 75 is an air-cooled air cooler.

In some embodiments, as the one depicted in FIG. 1, crankcase air from engine 10 block may be vented. In this particular embodiment, crankcase ventilation exits engine 10 block via line 40, where it is sent to the engine's 10 exhaust line. In other embodiments, which are not shown, the crankcase ventilation may be vented to atmosphere and it may further be filtered to remove any particulates.

For the particular embodiment of FIG. 1, exhaust gas 120 that is not recirculated via loop 60 enters exhaust line 90. As stated, exhaust gas 120 entering line 90 may be high. For example, during regeneration of filter 51, the exhaust temperature may be in excess of 650° C. To help minimize the risk of hazard to personnel and equipment, cooling device 100 cools exhaust 120 before exhaust 120 enters environment 80.

Referring to FIGS. 2-6, various embodiments of exhaust gas 120 cooling device 100 are depicted. In particular, FIGS. 2-6 depict cross-sectional views of various cooling devices 100. In these various embodiments, exhaust gas 120 enters device 100 from the left, the inlet, and exits to the right. Air 101 enters device 100 and mixes with exhaust gas 120. In most cases, air 101 entering device 100 is much cooler than exhaust gas 120 and the mixture 125 of air 101 and exhaust gas 120 results in a cool blend. In many cases, the mixture 125 exiting device 100 is sufficiently cooled for safe release to environment 80.

Referring to the particular embodiment of FIG. 2, as gas 120 enters device 100, the converging shape of device 100 from the inlet to the middle section—or throat—results in an increase in velocity of gas 120 from left to right. As the velocity of gas 120 increases, an associated pressure drop results. This associated pressure drop is well understood by one skilled in the art as Bernoulli's principle. The resultant pressure drop creates a slight vacuum in device 100. As the pressure within device 100 is slightly lower than atmospheric pressure, aspirated air 101 is drawn into device 100 from opening 124. The drawn in aspirated air 101 mixes and dilutes with exhaust gas 120 downstream of opening 124, resulting in a mixture 125 with a cooler overall temperature.

Now referring to FIG. 3, another embodiment of cooling device 100 is provided. The operation of device 100 in FIG. 3 is similar to the operation of device 100 in FIG. 2, in that the converging shape of device 100 and opening 124 allow for the mixing of exhaust gas 120 with aspirated air 101.

In the embodiment of FIG. 3, however, perforations 121 are present to promote mixture of aspirated air 101 with exhaust gas 120. In this particular embodiment, some of the exhaust gas 120 and aspirated air 101 mixture 125 may exit cooling device via perforations 121. In some cases, additional aspirated air 101 may enter perforations 121 to further mix and dilute exhaust gas 120.

Now referring to FIG. 4, another embodiment of cooling device 100 is provided. The operation of device 100 in FIG. 4 is similar to the operation of device 100 in FIG. 3, in that the converging shape of device 100, opening 124, and perforations 121 allow for the mixing of exhaust gas 120 with aspirated air 101.

In the embodiment of FIG. 4, however, cooling fins 122 are present for promoting the transfer of heat from cooling device 100 to the outside atmosphere. Cooling fins 122 are connected to device 100 and project outward from device 100, as shown. The cooling fins 122 conduct heat from device 100 and, through convection, transfer heat to the surrounding environment.

Now referring to FIG. 5, another embodiment of cooling device 100 is provided. The operation of opening 124 and perforations 121 is similar to the operation of FIGS. 3 and 4 for mixing exhaust gas 120 with aspirated air 101.

In the embodiment of FIG. 5, however, cooling fins 123 are present for promoting the transfer of heat from exhaust gas 120 to cooling device 100. Cooling fins 123 are connected to device 100 and project inward from device 100, as shown. Through convection, exhaust gas 120 transfers heat to cooling fins 123, which in turn transfer heat to device 100 through conduction.

Now referring to FIG. 6, another embodiment of cooling device 100 is provided. In this particular embodiment—as with the others of FIGS. 2-5—exhaust gas 120 enters device 100 from the left. Unlike the venturi-shape of devices 100 in embodiments of FIGS. 2-5, however, the middle-throat section of device 100 in FIG. 6 does not diverge from the throat to the outlet. As the passage of device 100 converges, the velocity of gas 120 increases, thus creating a pressure drop. A slight vacuum is created and draws aspirated air 101 into device 100, where it mixes with exhaust gas 120. The resultant mixture 125 of exhaust gas 120 and air 101 then exits device 100 to the right.

INDUSTRIAL APPLICABILITY

Referring back to FIG. 1, in operation, cooling device 100 cools at least some of the exhaust gas 120 exiting engine 10 before it is released to environment 80.

During operation of engine 10, exhaust gas 120 may or may not pass through one or two turbochargers 20 and 30. Afterwards, exhaust gas 120 may or may not then pass through particulate filter 51.

Particulate filter 51 may be configured to collect particulate matter from exhaust gas 120, such as soot or hydrocarbons. Once filter 51 collects any soot or hydrocarbons, filter 51 may regenerate to burn at least some of the filtered soot or hydrocarbons.

In the embodiment of FIG. 1, regeneration may be initiated with the addition of thermal energy from regeneration device 50. In at least one example, device 50 may be a burner configured to direct heat to filter 51, thus causing soot or hydrocarbons to burn within filter 51. As depicted, burner 50 may be positioned upstream of filter 51. This burn results in the release of thermal energy, which may further increase the temperature of exhaust gas 120. In some cases, the temperature of exhaust gas during regeneration may be as high as 650° C. or higher.

Some, all, or none of exhaust gas 120 may then enter recirculation line 60, where it would be mixed with ambient air from intake 70. Some of this exhaust gas may also be cooled prior to mixing with cooler 61. In at least one example, cooler 61 may be a jacket-water cooled parallel-flow heat exchanger. The reader should appreciate, however, that any heat exchanger known in the art may be used to cool exhaust gas 120 within line 60. The reader should also appreciate that a cooler 61 is also not necessary.

For the exhaust gas 120 that is not mixed with intake air 70, the gas 120 enters cooling device 100, where some or all of the gas 120 may be cooled to a level safe for discharge to environment 80.

Referring to FIGS. 2-6, as exhaust gas 120 enters device 100 from the left, a vacuum is created as the velocity of the gas 120 increases with the converging passageway. This increase in velocity results in a corresponding pressure drop, which creates a vacuum within device 100. The vacuum then draws in aspirated air 100 through opening 124.

As aspirated air 101 mixes with exhaust gas 120, the temperature of exhaust gas 120 most often drops, as the temperature of air 101 is usually lower than the temperature of exhaust gas 120. The resultant mixture 125 then leaves device 100 from the right, as shown, towards environment 80.

Other embodiments of the disclosed exhaust treatment system 10 will be apparent to those skilled in the art from consideration of the specification. It is intended that the specification and examples be considered as exemplary only, with the true scope of the invention being indicated by the following claims.

What is claimed is:

1. An exhaust gas cooling device for cooling gases within an exhaust stream of an exhaust producing engine, comprising:
   a conduit including:
      a tapered side wall having:
         an inlet section having a first diameter;
         a mixing section downstream of the inlet section and having a second diameter smaller than the first diameter; and
         an opening in the tapered side wall providing fluid communication between the mixing section in the conduit and a source of air;
   wherein, when the exhaust gases are flowing through the conduit from the inlet section to the mixing section, a vacuum is created in the conduit which draws air from the source of air through the opening into the mixing section; and
   wherein the air drawn into the mixing section mixes with the exhaust gases in the mixing section to create a mixture of air and exhaust gases.

2. The device of claim 1, further comprising cooling fins for cooling the exhaust gases or the mixture of air and exhaust gases.

3. The device of claim 2, in which the cooling fins project radially outward from the device.

4. The device of claim 2, in which the cooling fins project radially inward from the device.

5. The device of claim 1, in which the device is shaped like a venturi.

6. The device of claim 1, further comprising perforations in the conduit.

7. The device of claim 6, in which the perforations are downstream of the opening in the side wall.

8. An exhaust gas cooling device for cooling gases within an exhaust stream of an exhaust producing engine, comprising:
   a conduit shaped like a venturi, including:
      a tapered side wall including:
         an inlet section having a first diameter;
         a mixing section downstream of the inlet section and having a second diameter smaller than the first diameter; and
         an opening in the tapered side wall providing fluid communication between the mixing section in the conduit and a source of air outside the conduit;
   wherein, when the exhaust gases are flowing through the conduit from the inlet section to the mixing section, a vacuum is created in the conduit which draws air from the source of air through the opening in the tapered side wall into the mixing section of the conduit where the air mixes with the exhaust gases creating a mixture of air and exhaust gases; and
   wherein the conduit includes cooling fins extending from the side wall for cooling the exhaust gases or the mixture of air and exhaust gases.

9. The device of claim 8, wherein the cooling fins project radially outward from the side wall of the conduit.

10. The device of claim 8, wherein the cooling fins project radially inward from the side wall of the conduit.

* * * * *